United States Patent
Kozomora et al.

(10) Patent No.: US 10,747,708 B2
(45) Date of Patent: Aug. 18, 2020

(54) COMMUNICATION SYSTEM BETWEEN ELECTRONIC DEVICES

(71) Applicant: Allegro MicroSystems, LLC, Manchester, NH (US)

(72) Inventors: Nevenka Kozomora, Windham, NH (US); Richard Vreeland, Litchfield, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 91 days.

(21) Appl. No.: 15/915,185

(22) Filed: Mar. 8, 2018

(65) Prior Publication Data

US 2019/0278737 A1    Sep. 12, 2019

(51) Int. Cl.
| | | |
|---|---|---|
| H04J 3/06 | (2006.01) | |
| G06F 13/42 | (2006.01) | |
| G06F 11/07 | (2006.01) | |
| H04L 12/40 | (2006.01) | |
| G06F 1/12 | (2006.01) | |

(52) U.S. Cl.
CPC ...... *G06F 13/4295* (2013.01); *G06F 11/0745* (2013.01); *G06F 11/0784* (2013.01); *H04J 3/0602* (2013.01); *H04L 12/4015* (2013.01); *G06F 1/12* (2013.01); *H04J 3/06* (2013.01); *H04L 2012/40208* (2013.01)

(58) Field of Classification Search
CPC .... G06F 13/4295; G06F 13/4278; G06F 1/12; H04J 3/0602; H04J 3/0658; H04J 3/06; H04J 3/0652; H04L 12/43; H04L 12/4015; H04L 2012/40215; H04L 7/0037
See application file for complete search history.

(56) References Cited

U.S. PATENT DOCUMENTS

| | | |
|---|---|---|
| 3,074,636 A | 1/1963 | Baker et al. |
| 3,993,870 A | 11/1976 | Schwartz |
| 4,149,144 A | 4/1979 | Diefenderfer |

(Continued)

FOREIGN PATENT DOCUMENTS

| | | |
|---|---|---|
| DE | 100 30 358 A1 | 6/2000 |
| DE | 102 03 483 A1 | 5/2001 |

(Continued)

OTHER PUBLICATIONS

SAE International "Surface Vehicle Information Report;" J2716; Jan. 20, 2010; 56 Pages.

(Continued)

*Primary Examiner* — Ernest Unelus
(74) *Attorney, Agent, or Firm* — Daly, Crowley, Mofford & Durkee, LLP (57) ABSTRACT

A system for communicating between electronic devices on a communication bus includes a communication bus and one or more communication circuits each having an output driver coupled to the communication bus and each having an input terminal. Each communication circuit produces, in response to a request message, a data communication on the communication bus in a predetermined order with respect to data communications from other communication circuits so that the data communications from each communication circuit form a sequential data stream in response to the request message.

23 Claims, 6 Drawing Sheets

(56) References Cited

U.S. PATENT DOCUMENTS

| | | |
|---|---|---|
| 4,907,223 A | 3/1990 | Wroblewski |
| 5,335,186 A | 8/1994 | Tarrant |
| 5,361,260 A | 11/1994 | Mito |
| 5,574,849 A | 11/1996 | Sonnier et al. |
| 5,606,717 A | 2/1997 | Farmwald et al. |
| 5,646,609 A | 7/1997 | O'Brien |
| 5,675,811 A | 10/1997 | Broedner et al. |
| 5,689,689 A | 11/1997 | Meyers et al. |
| 5,860,022 A | 1/1999 | Kondou et al. |
| 6,014,137 A | 1/2000 | Burns |
| 6,111,888 A | 8/2000 | Green et al. |
| 6,112,275 A | 8/2000 | Curry et al. |
| 6,118,186 A | 9/2000 | Scott et al. |
| 6,233,534 B1 | 5/2001 | Morozumi et al. |
| 6,288,567 B1 | 9/2001 | Fink |
| 6,292,494 B1 | 9/2001 | Baker et al. |
| 6,345,220 B1 | 2/2002 | Ikegami |
| 6,426,916 B2 | 7/2002 | Farmwald et al. |
| 6,522,944 B2 | 2/2003 | Wielebski et al. |
| 6,542,847 B1 | 4/2003 | Lohberg et al. |
| 6,563,419 B1 | 5/2003 | Herz et al. |
| 6,618,628 B1 | 9/2003 | Davlin et al. |
| 6,687,644 B1 | 2/2004 | Zinke et al. |
| 6,701,214 B1 | 3/2004 | Wielebski et al. |
| 6,715,020 B2 | 3/2004 | Farmwald et al. |
| 6,728,819 B2 | 4/2004 | Farmwald et al. |
| 6,751,696 B2 | 6/2004 | Farmwald et al. |
| 6,772,254 B2 | 8/2004 | Hofmann et al. |
| 6,825,625 B1 | 11/2004 | Karwath et al. |
| 6,838,999 B1 | 1/2005 | Ropke |
| 6,952,618 B2 | 10/2005 | Davlin et al. |
| 6,968,484 B2 | 11/2005 | Hummel |
| 6,975,558 B2 | 12/2005 | Farmwald et al. |
| 7,038,412 B2 | 5/2006 | Karwath et al. |
| 7,110,322 B2 | 9/2006 | Farmwald et al. |
| 7,158,900 B2 | 1/2007 | McNutt |
| 7,191,269 B2 | 3/2007 | Cluff |
| 7,207,014 B2 | 4/2007 | Velasco et al. |
| 7,209,997 B2 | 4/2007 | Farmwald et al. |
| 7,254,452 B2 | 8/2007 | Davlin et al. |
| 7,319,418 B2 | 1/2008 | Fink |
| 7,366,115 B2 | 4/2008 | Vandensande |
| 7,366,597 B2 | 4/2008 | Hartrey et al. |
| 7,466,123 B2 | 12/2008 | Kato et al. |
| 7,558,646 B2 | 7/2009 | Matsumoto et al. |
| 7,668,674 B2 | 2/2010 | McNutt et al. |
| 7,717,085 B1 | 5/2010 | Bauerle |
| 7,761,251 B2 | 7/2010 | Bauerle |
| 7,774,074 B2 | 8/2010 | Davlin et al. |
| 7,877,208 B1 | 1/2011 | Battista |
| 7,990,983 B2 | 8/2011 | Denham |
| 7,996,104 B2 | 8/2011 | Wielebski et al. |
| 8,122,159 B2 | 2/2012 | Monreal |
| 8,290,094 B2 | 10/2012 | Kolof et al. |
| 8,380,905 B2 | 2/2013 | Djabbari et al. |
| 8,386,657 B2 | 2/2013 | Adkins et al. |
| 8,461,782 B2 | 6/2013 | Ward et al. |
| 8,543,263 B2 | 9/2013 | Danielsson et al. |
| 8,577,634 B2 | 11/2013 | Donovan et al. |
| 8,716,674 B2 | 5/2014 | Sherwood |
| 9,003,096 B2 | 4/2015 | Trifonov et al. |
| 9,172,565 B2 | 10/2015 | Cadugan et al. |
| 9,552,315 B2 | 1/2017 | Monreal |
| 9,634,715 B2 | 4/2017 | Scheinkerman et al. |
| 9,739,846 B2 | 8/2017 | Petrie et al. |
| 9,787,495 B2 | 10/2017 | Vreeland et al. |
| 2001/0011892 A1 | 8/2001 | Ropke |
| 2002/0015389 A1 | 2/2002 | Wastlhuber et al. |
| 2002/0053970 A1 | 5/2002 | Plummer |
| 2003/0220702 A1 | 11/2003 | McNutt |
| 2004/0078097 A1 | 4/2004 | Bruzy et al. |
| 2004/0100394 A1 | 5/2004 | Hitt |
| 2004/0233929 A1 | 11/2004 | Hall et al. |
| 2005/0128100 A1 | 6/2005 | Petrocy |
| 2005/0128830 A1 | 6/2005 | Nishihara et al. |
| 2005/0228914 A1 | 10/2005 | Ishida |
| 2005/0267701 A1 | 12/2005 | McNutt |
| 2005/0289269 A1 | 12/2005 | Nakayama et al. |
| 2006/0024055 A1 | 2/2006 | Kawase et al. |
| 2006/0041630 A1 | 2/2006 | Naismith |
| 2006/0224776 A1 | 10/2006 | Vanderhenst |
| 2006/0282592 A1 | 12/2006 | Zakriti |
| 2007/0094459 A1 | 4/2007 | Suzuki et al. |
| 2007/0198139 A1 | 8/2007 | Boran et al. |
| 2007/0236164 A1 | 10/2007 | Xia et al. |
| 2007/0236825 A1 | 10/2007 | Xia et al. |
| 2008/0061725 A1 | 3/2008 | Wu et al. |
| 2008/0098144 A1 | 4/2008 | Rees et al. |
| 2008/0115512 A1 | 5/2008 | Rizzo |
| 2008/0189459 A1 | 8/2008 | Takeuchi |
| 2008/0288662 A1 | 11/2008 | Doorenbos |
| 2009/0185081 A1 | 7/2009 | Ueno et al. |
| 2010/0095035 A1 | 4/2010 | Chen et al. |
| 2010/0211190 A1 | 8/2010 | Akita |
| 2010/0231262 A1 | 9/2010 | Ito |
| 2011/0205600 A1 | 8/2011 | Hibiya |
| 2012/0083902 A1 | 4/2012 | Daum et al. |
| 2012/0086442 A1 | 4/2012 | Haas et al. |
| 2012/0325020 A1 | 12/2012 | Mueller |
| 2013/0197851 A1 | 8/2013 | Bhawmik |
| 2013/0335068 A1 | 12/2013 | Dwyer et al. |
| 2014/0086258 A1 | 3/2014 | Kwan et al. |
| 2014/0214970 A1 | 7/2014 | Rasbornig et al. |
| 2014/0258566 A1 | 9/2014 | Bowling et al. |
| 2015/0100818 A1 | 4/2015 | Kegel et al. |
| 2015/0227204 A1 | 8/2015 | Gipson et al. |
| 2016/0247391 A1 | 8/2016 | Wagner et al. |
| 2017/0163366 A1 | 6/2017 | Aichriedler |
| 2017/0317812 A1* | 11/2017 | Leng .................. H04L 7/0037 |

FOREIGN PATENT DOCUMENTS

| | | |
|---|---|---|
| DE | 101 47 512 A1 | 4/2003 |
| EP | 1 467 523 A2 | 10/2004 |
| FR | 2885710 A1 | 11/2006 |
| GB | 2 353 448 A | 2/2001 |
| JP | H1032479 A | 2/1998 |
| JP | H1185806 A | 3/1999 |
| JP | 2003-044972 A | 2/2003 |
| JP | 2003/279651 A | 10/2003 |
| JP | 2006/242908 A | 9/2006 |
| JP | 2007/272807 A | 10/2007 |
| JP | 2008/022638 A | 1/2008 |
| JP | 2010/127857 A | 6/2010 |
| WO | WO 2014/167090 A1 | 10/2014 |
| WO | WO 2016/144555 | 9/2016 |

OTHER PUBLICATIONS

"3-Axis Digital Compass IC, HMC5883L;" Honeywell Advanced Information; XP-002671326; Oct. 2010; 18 pages.

AN1816, Using the HC912B32 to Implement the Distributed Systems Interface (DSI) Protocol; by Tracy McHenry, Motorola, Freescale Semiconductor, Inc., Aug. 1999, 24 pages.

"Digital Temperature Sensor with I$^2$C$^{TM}$ Interface;" Burr-Brown Products from Texas Instruments; TMP100, TMP101; XP-002671327; Jan. 2002—revised Nov. 2007; Package Option Addendum dated Aug. 20, 2011; 19 pages.

DSI Bus Standard, Version 2.02, TRW Automotive, Launched by Motorola, Freescale Semiconductor, Mar. 29, 2005, 18 pages.

Freescale Semiconductor, Inc., "Distributed System Interface (DSI) Sensor Interface", Document No. MC33793/D, Motorola, Semiconductor Technical Data, Rev 10, Jul. 2003, 27 pages.

Freescale Semiconductor, Advance Information "Two-Channel Distributed System Interface (DSI) Physical Interface Device", Document No. MC33790, Rev 11.0, Mar. 2008, 13 pages.

Infineon, "TLE4998S3, TLE4998S4 Programmable Linear Hall Sensor;" Data Sheet, vol. 1.0, Jul. 2008; 39 pages.

Infineon Technologies, Application Note for part TLE4998C, Rev. 1.0, Feb. 2009 "User Programming Guide", 44 pages.

PSI5 Organization: Peripheral Sensor Interface for Automotive (56) References Cited

OTHER PUBLICATIONS

Applications; Jul. 29, 2008; PSI5 Technology Specification, vol. 1.3, 47 pages.
"Single Edge Nibble Transmission for Automotive Applications;" SAE International; Surface Vehicle Information Report; SAE J2716 Jan. 2010; Issued Apr. 2007—Revised Jan. 2010; 56 pages.
"The I²C Bus Specification;" Version 2.1; Phillips Semiconductors; XP-002590803; dated Jan. 2000; 46 pages.
"TMS320x281x, 280x DSP Serial Peripheral Interface (SPI) Reference Guide;" Texas Instruments; Literature No. SPRU059B; XP-002369243; Issued Jun. 2002—Revised Nov. 2004; 49 pages.
Response (with Amended Claims) to European 161/162 Communication dated Sep. 16, 2016 corresponding to European Application No. 15706301.7; Response filed Mar. 21, 2017; 9 pages.
European 161/162 Communication dated Sep. 16, 2016 corresponding to European Application No. 15706301.7; 2 pages.
Response to European Communication dated Oct. 11, 2017 for European Application No. 16708892.1; Response filed Apr. 18, 2018; 9 pages.
Response to European Communication dated Oct. 20, 2017 for European Application No. 16719950.4; Response filed Apr. 27, 2018; 9 pages.
PCT International Preliminary Report dated Aug. 23, 2016 for International Application No. PCT/US2015/011347; 8 pages.
PCT International Search Report and Written Opinion dated Apr. 23, 2015 for International Application No. PCT/US2015/011347; 10 pages.
PCT International Search Report and Written Opinion dated Jun. 2, 2016 for PCT Application No. PCT/US2016/019451; 9 pages.
PCT International Search Report and Written Opinion dated Jul. 5, 2016 for PCT Application No. PCT/US2016/019457, 10 pages.
Response to U.S. Non-Final Office dated Feb. 18, 2015 for U.S. Appl. No. 14/182,595; Response Filed on May 13, 2015; 12 Pages.
U.S. Non-Final Office Action dated Feb. 18, 2015; for U.S. Appl. No. 14/182,595; 18 pages.
Notice of Allowance dated Aug. 19, 2015 for U.S. Appl. No. 14/182,595; 21 pages.
Notice of Allowance dated Jun. 19, 2017 for U.S. Appl. No. 14/645,957; 8 pages.
Notice of Allowance dated May 22, 2017 for U.S. Appl. No. 14/645,957; 9 pages.
Response to U.S. Non-Final Office Action dated Dec. 2, 2016 for U.S. Appl. No. 14/645,957; Response filed Feb. 27, 2017; 16 pages.
U.S. Non-Final Office Action dated Dec. 2, 2016 for U.S. Appl. No. 14/645,957; 13 pages.
Notice of Allowance dated Jan. 17, 2017 for U.S. Appl. No. 14/645,946; 5 pages.
Notice of Allowance dated Apr. 29, 2016; for U.S. Appl. No. 14/645,946; 9 pages.
Response to U.S. Non-Final Office Action dated Jul. 6, 2016 for U.S. Appl. No. 14/645,946; Response filed Sep. 9, 2016; 16 pages.
U.S. Non-Final Office Action dated Jul. 6, 2016 for U.S. Appl. No. 14/645,946; 15 pages.
Response to U.S. Non-Final Office Action dated Nov. 13, 2015 for U.S. Appl. No. 14/645,946; Response filed Mar. 11, 2016; 16 pages.
U.S. Non-Final Office Action dated Nov. 13, 2015; for U.S. Appl. No. 14/645,946; 13 pages.
Voluntary Amendment and English language summary dated Nov. 24, 2017 for Japanese Application No. 2017-548051; 7 Pages.
Voluntary Amendment and English language summary dated Nov. 7, 2017 for Korean Application No. 10-2017-7028727; 24 Pages.
EPO Extended European Search Report dated Jul. 1, 2019 for EP Pat. Appl. No. 19161160.7-1216; 9 pages.
Response (with Amended Claims) to Official Communication dated Sep. 16, 2019 and to the Extended European Search Report (EESR) dated Jul. 1, 2019 for European Application No. 19161160.7; Response filed Mar. 11, 2020; 19 Pages.

\* cited by examiner

COMMUNICATION SYSTEM BETWEEN ELECTRONIC DEVICES

FIELD

This disclosure relates to electronic communication and, more particularly, to low latency serial communication.

BACKGROUND

Serial communication protocols between electronic devices, particularly single-wire protocols, often include a host controller device and one or more slave devices communicating on a common bus. Examples of such communication protocols include the I²C protocol, SMBus protocol, CAN protocol, etc.

These protocols typically include a one or more host or controller devices that transmit requests onto the bus, and one or more slave devices that transmit responses onto the bus. If the host device is to receive data from multiple slave devices, the host device will send a request to the first device that includes the first device's address. Then, after the first device response, the host sends another request to the second device that includes the second device's address. Addressing each slave device individually may cause undesirable latency, especially in applications such as automotive systems monitoring systems, which may require fast response times with low latency.

SUMMARY

In an embodiment, a system includes a communication bus and one or more communication circuits each having an output driver coupled to the communication bus and each having an input terminal. Each communication circuit produces, in response to a request message, a data communication on the communication bus in a predetermined order with respect to data communications from other communication circuits so that the data communications from each communication circuit form a sequential data stream in response to the request message.

One or more of the following features may be included. The input terminals from slave communication circuits may be coupled to the communication bus to allow the communication circuit to read messages from the communication bus.

The input terminal and the output driver of each communication circuit may share a common connection to the communication bus.

Two or more of the communication circuits may be situated in a same package.

All the communication circuits may be situated in the same package.

The input terminals may be connected to a synchronization bus to receive synchronization signals.

The synchronization bus may be internal to a package containing one or more of the communication circuits.

At least a portion of the synchronization bus may be external to a package containing one or more communication circuits.

The synchronization signals may provide information to coordinate the predetermined time order between the communication circuits, so that the data communications from each communication circuit forms the contiguous data stream.

The synchronization bus may be a common bus.

The synchronization bus may be a daisy-chain bus.

The communication circuits may transmit the data communications in response to synchronization signals received from the synchronization bus.

The synchronization signals may be produced by one or more of the communication circuits.

The data stream may comprise a synchronization message before each data communication.

The synchronization message may be produced by a host circuit.

The synchronization message may be produced by one or more of the communication circuits.

One synchronization message may be produced at the beginning of the data stream.

The data stream may comprise multiple synchronization messages, each preceding a data communication in the data stream.

One or more of the communication circuits may produces an error check message.

The error check message may be generated based on all the data communications in the data stream.

The error check message may follow one or more of the data communications in the data stream.

The error check message may be generated at the end of the data stream.

The communication circuits may communicate on the bus according to a SENT protocol.

Each communication circuit may comprise a magnetic field sensor.

The data communications from each communication circuit form a time-contiguous data stream.

In another embodiment, a communication circuit includes an output driver coupled to a communication bus; an input terminal configured to receive a synchronization message; and communication circuitry configured to produce, in response to a request message, a data communication on the communication bus in a predetermined order with respect to data communication from other communication circuits so that the data communication is generated as a portion of a sequential data stream in response to the request message.

One or more of the following features may be included.

The output driver and the input terminal may be coupled to the same communication bus.

The input terminal may be coupled to a synchronization bus.

In another embodiment, a method of communicating data from multiple communication circuits operating on a communication bus includes transmitting a request message on the communication bus; receiving the request message by one or more communication circuits operating on the communication bus; and in response to receiving the request message, transmitting, by each of the communication circuits at a predetermined time, a communication message, wherein the communication messages communicated by the communication circuits form a sequential data stream on the communication bus.

BRIEF DESCRIPTION OF THE DRAWING

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular a substrate that supports the magnetic field sensing element. In particular, planar Hall elements tend to have axes of sensitivity perpendicular to a substrate, while metal based or metallic magneto resistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the terms "target" and "magnetic target" are used to describe an object to be sensed or detected by a magnetic field sensor or magnetic field sensing element.

Figure 1:
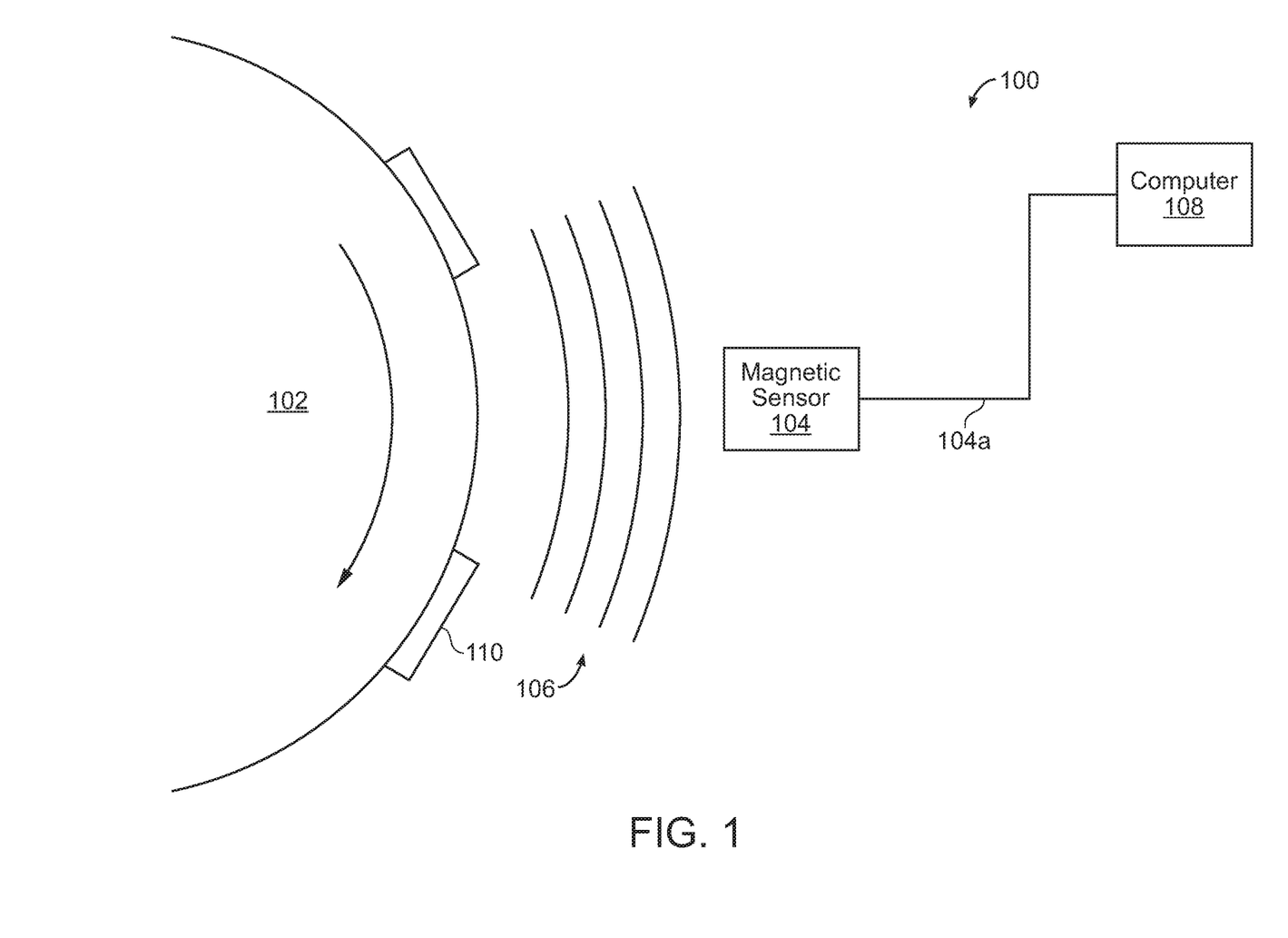
FIG. 1 is a block diagram of a system for communicating data between a magnetic field sensor and host computer.

FIG. 1 is a block diagram of a system 100 for detecting a target 102. System 100 includes a magnetic field sensor 104 placed adjacent to target 102 so that a magnetic field 106 can be sensed by magnetic field sensor 104.

In an embodiment, target 102 is a magnetic target and produces magnetic field 106. In another embodiment, magnetic field 106 is generated by a magnetic source (e.g. a back-bias magnet or electromagnet) that is not coupled to target 102. In such embodiments, target 102 may be a ferromagnetic target that does not itself tend to generate a magnetic field. In the case where the target is a ferromagnetic target, as target 102 moves through or within magnetic field 106 generated by a back-bias magnet or electromagnet, it causes perturbations to magnetic field 106 that can be detected by magnetic field sensor 104.

Magnetic field sensor 104 may be coupled to a computer 108, which may include a general purpose processor executing software or firmware, a custom processor, or an electronic circuit for processing output signal 104a from magnetic field sensor 104. Output signal 104a may provide information about the speed and direction of target 102 to computer 108, which may then perform operations based on the received speed and direction. In an embodiment, magnetic field sensor 104 changes the state of output signal 104a when the detected magnetic field crosses a predetermined threshold.

In an embodiment, computer 108 is an automotive computer installed in a vehicle and target 102 is, or is coupled to, a moving part within the vehicle, such as a transmission shaft, a brake rotor, etc. Magnetic field sensor 104 detects the speed and direction of target 102 and computer 108 controls automotive functions (like all-wheel drive, ABS, etc.) in response to the detected speed and direction.

Target 102 can comprise any element capable of affecting magnetic field 106 through motion or proximity. For example, target 102 may be attached to a rotating shaft in an automotive transmission or brake system.

As shown in FIG. 1, target 102 may be a gear having teeth 110. As target 102 moves or rotates, teeth 110 affect magnetic field 106, which can be detected by magnetic field sensor 104. By detecting such changes to magnetic field 106, system 100 can determine speed and/or direction of target 102. Although shown as a rotating gear, target 102 can take any form capable of being detected by magnetic sensor including, but not limited to: a toothed rack in a rack and pinion system; a gear; a gear with teeth, with magnets (e.g., a ring magnet), or other features on or attached to a shaft; etc. Also, although shown as separate elements, computer 108 and magnetic field sensor 104 may be part of the same circuit, part of the same integrated circuit, or contained in the same package.

Sensor 104 may communicate with computer 108 using a serial communication protocol. For example, sensor 104 may communicate using a single-line protocol, such as the SENT protocol, the I²C protocol, or the like. In this case, signal 104a may travel on a single wire. In other embodiments, other protocols may be used and signal 104*a* may travel over a differential wire or a bus.

Figure 2:
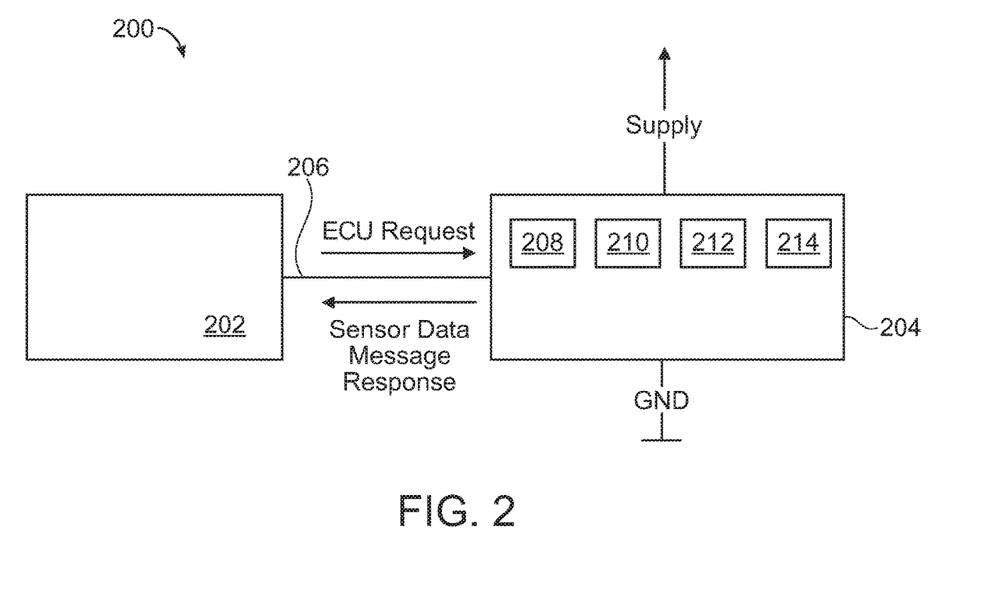
FIG. 2 is a block diagram of a system for communicating data between a magnetic field sensor and host computer.

Referring to FIG. 2, system 200 may include computer 202, which may be the same as or similar to computer 108. Computer 202 may communicate with electronic device 204 over communication bus 206. Communication bus 206 may be a serial communication bus comprising one or more wires. In embodiments, computer 202 and electronic device 204 may communicate over bus 206 using a protocol that is the same as or similar to the SENT protocol, the I²C protocol, or another single-wire protocol.

Electronic device 204 may comprise one or more circuits 208-214 that generate data to be communicated to computer 202. Each circuit may include a receiver, transmitter, or transceiver circuit coupled to bus 206 that provides each circuit with the functionality to drive and communicate on bus 206. For example, circuits 208-214 may be magnetic field sensors in a motor vehicle that collect data about the operation of the motor vehicle.

Circuits 208-214 may be integrated circuits, some or all of which are supported by a separate die in the same or in a separate integrated circuit package. Alternatively, some or all of circuits 208-214 may be supported on the same die. Electronic device 204 may comprise a number of disparate circuits (e.g. circuit 208-214) that are communicatively coupled to bus 206 and can coordinate communication of data across bus 206 among themselves. For example, electronic device 204 may be four brake rotor rotation sensors, each located at a different wheel of a vehicle, that can coordinate communication over bus 206. Although four circuits 208-214 are shown, electronic device 204 may include any arbitrary number of circuits for communicating on bus 206.

Figure 3:
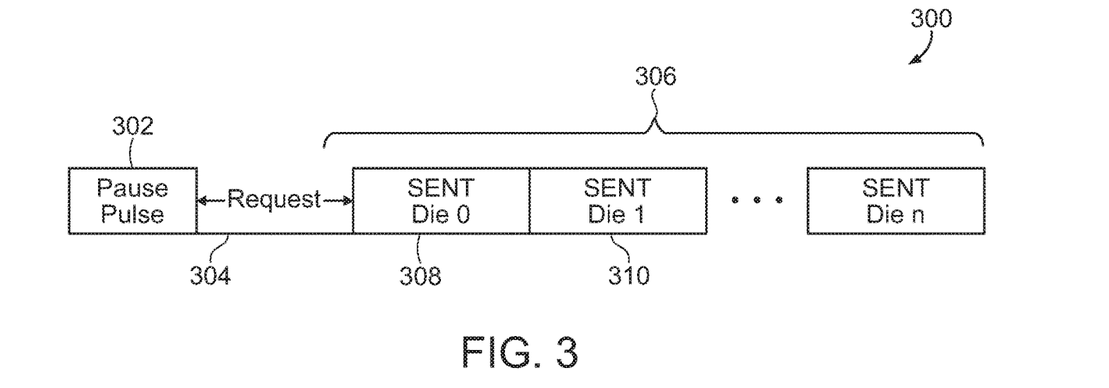
FIG. 3 is a data sequence diagram of a data message for communication over a serial bus.

FIG. 3 is a diagram 300 of data communicated across bus 206. The horizontal axis of diagram 300 represents time. In this example, the communication sequence begins with a so-called "pause pulse" 302 where bus 206 is idle. Computer 202 may then send a request 304 for data from electronic device 204 by, for example, driving a voltage on bus 206 low for a specified amount of time. Electronic device 204 may answer the request by sending response 306, which may include an aggregation of data from more than one of circuits 208-214. For example, data unit 308 may include data from circuit 208, data unit 310 may include data from circuit 210, etc. Circuits 208-214 may communicate and coordinate with each other so that each circuit 208-214 drives its own data onto bus 206 in a predetermined sequence to form message 306.

Figure 4:
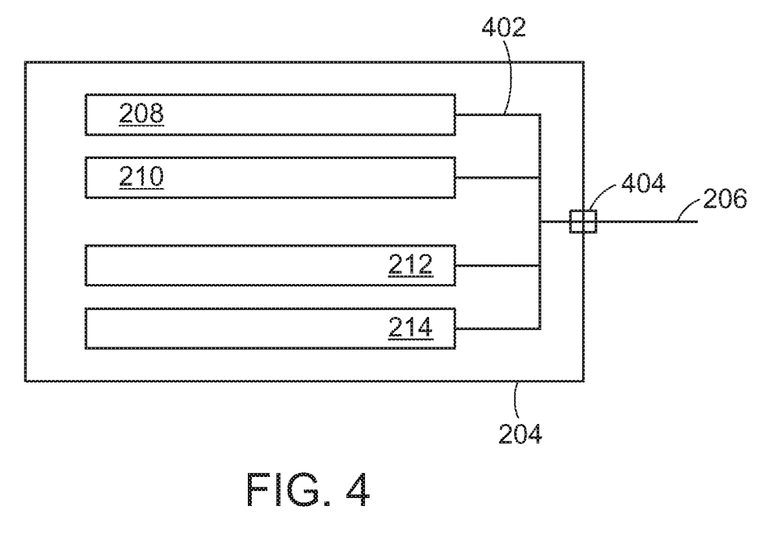
FIG. 4 is a block diagram of a device that communicates serial data over a bus.

Referring to FIG. 4, circuits 208-214 may be coupled to a communication bus 402, which may be a one-wire bus. In an embodiment, circuits 208-214 and bus 402 may be internal to electronic device 204. For example, circuits 208-214 and bus 402 may be enclosed in the same electronic device package. Bus 402 may be coupled to bus 206 through pin 404, which may be a pin, ball, bond pad, or other type of electrical access point that permits electrical connection to circuits within the electronic device package.

Each circuit 208-214 may use a transceiver to read and write data to bus 402. For example, when a request for data is sent (e.g. request 304 in FIG. 3), circuits 208-214 may each receive the request. Circuits 208-214 may then coordinate their responses so that they form a predetermined sequence of responses. In one example, circuit 208 may transmit data unit 308 onto the bus. When circuit 210 reads the bus and discovers data unit 308 has been sent, circuit 210 may then transmit data unit 310 onto the bus. When circuit 212 reads the bus and discovers data unit 310 has been sent, circuit 212 may transmit its data packet, etc. In this example, each circuit 208-214 contains information about when it should transmit its data. For example, each circuit may include a sequence number (e.g. an address) that its data will appear in the resulting message. Circuit 208 may be configured to transmit first, circuit 210 to transmit second, circuit 212 to transmit third, etc. Thus, circuit 208 may include the sequence number 0 indicating that its data will be transmitted first, circuit 210 may include the sequence number 1 indicating its data will be transmitted next, etc. Each circuit reads the bus, counts the number of data units sent, and inserts its data unit onto the bus at the appropriate time to generate a sequential stream of data.

Figure 5:
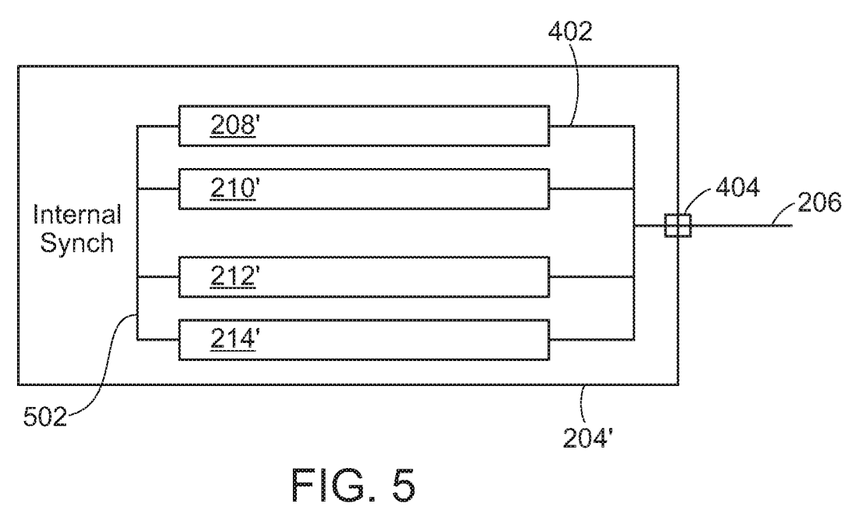
FIG. 5 is a block diagram of another embodiment of a device that communicates serial data over a bus.

Referring to FIG. 5, in another embodiment, an electronic device 204' may be similar to electronic device 204, and communication circuits 208'-214' may be similar to communication circuits 208-214. Electronic device 204' may include an internal synchronization bus 502 to synchronize transmission of data units by the communication circuits 208'-214'. In this example, bus 502 may be a shared, or common, bus that can be written to and read from by each circuit 208'-214'. Thus, circuits 208'-214' may drive signals onto and read signals from synchronization bus 502 during communication. The circuits that are not currently driving a signal onto bus 502 may read the signals transmitted by the other circuits. In embodiments, synchronization bus 502 may be a serial bus or a parallel bus.

In one example, each circuit 208'-214' drives a signal onto synchronization bus 502 to indicate transmission of a data unit, by the respective circuit, onto bus 402. For example, circuit 208' may drive a signal onto bus 502 to indicate transmission of data unit 308, circuit 210' may drive a signal onto bus 502 to indicate transmission of data unit 310, etc. Each circuit may drive the signal onto bus 502 at the beginning of, the end of, or during transmission of the data packet. The signal may be a simple logic bit (e.g. a high or low voltage driven onto bus 502), a series of bits driven serially, or a series of bits driven in parallel (in the case that bus 502 is a parallel bus). In one example, the circuits may transmit the signal by pulling bus 502 to a low voltage for the duration of the time that they transmit data onto bus 402. When the bus is released, the next circuit can drive bus 502 low and transmit its data onto bus 402.

Each circuit may also transmit its sequence number onto synchronization bus 502. For example, at the end of its transmission, circuit 208 may transmit its sequence number '0' onto bus 502. The other circuits may receive this transmission as acknowledgment that circuit 208 completed its transmission. In response, the next circuit in the sequence may transmit its data onto bus 402, and transmit its sequence number '1' onto synchronization bus 502 to indicate that it completed its transmission. This process may continue until all the communication circuits have transmitted their data units onto bus 502.

The other circuits (i.e. the circuits that are not driving a data packet onto bus 402) may read the signal on bus 502 to determine when they should transmit their data packets. In one embodiment, circuits 208'-214' may count the number of logic signals to determine when they should transmit. For example, if circuit 214' is to transmit fourth in the sequence, circuit 214' may count the number of signals driven onto bus 502 by circuits 208', 210', and 212'. After circuit 214' counts three signals driven to bus 502 indicating that three data units have been transmitted to bus 402, circuit 214' may transmit its data unit in the fourth position in the sequence. If circuit 214' is the last circuit in the sequence, it may not need to trans its own signal onto bus 502. However, in other embodiments, circuit 214' may transmit its own signal onto bus 502, even if it is the last circuit in the sequence, to inform the other circuits that the last data unit was transmitted. The other circuits may then perform post transmission processing, if needed.

Figure 6:
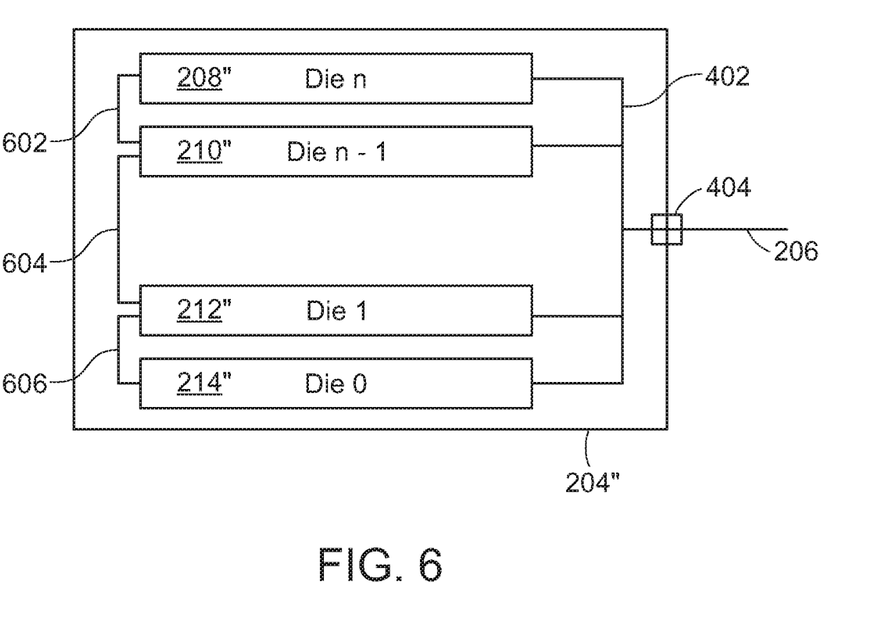
FIG. 6 is a block diagram of another embodiment of a device that communicates serial data over bus.

Referring to FIG. 6, in another embodiment, electronic device 204" may be similar to electronic device 204 and 204', and circuits 208"-214" may be similar to circuits 208-214 and 2-9'-214'.

Electronic device 204" may include a daisy-chained synchronization bus between circuits 208"-214". The daisy-chained synchronization bus may include one or more direct, point-to-point connections between circuits 208"-214", such as bus 602 between circuit 208" and 210", bus 604 between circuit 210" and 212", and bus 606 between circuit 212" and 214". The circuit 208"-214" may include a receiver to receive a signal from one of the daisy-chained busses, and a transmitter to transmit a signal on another of the daisy-chained busses.

In operation, each circuit 208"-214" will transmit a signal on a daisy-chained bus to synchronize transmission with the next circuit. For example, circuit 208" may transmit a signal onto bus 602 to indicate that it has transmitted data unit 308 onto bus 402. Circuit 210" may receive the signal on bus 602, which may trigger circuit 210" to subsequently transmit data unit 310 onto bus 402. Circuit 210" may then transmit a signal on bus 604 indicating that data unit 310 has been transmitted. Circuit 212" may receive the signal on bus 604, which may trigger circuit 212" to send its data unit onto bus 402, etc. This may continue until all the circuits 208"-214" have transmitted their data units onto bus 402 to form message 306.

Although not shown, electronic device 204" may have an additional daisy-chained bus between circuit 214" and circuit 208" to make a complete daisy-chain circle between the circuits 208"-214". This allows any arbitrary circuit in the daisy-chain to be configured as the first circuit to transmit.

Figure 6A:
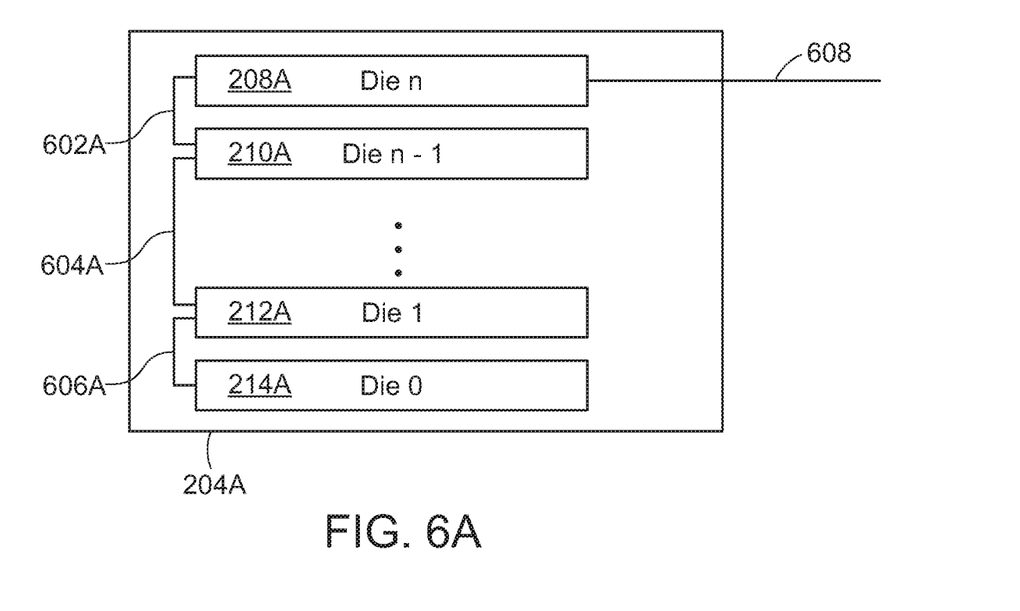
FIG. 6A is a block diagram of another embodiment of a device that communicates serial data over a bus.

Referring to FIG. 6A, in another embodiment, electronic device 204A may be similar to electronic device 204, 204', and 204", and circuits 208A-214A may be similar to circuits 208-214, 208'-214', and 208"-214".

Electronic device 204A may include a daisy-chained synchronization bus between circuits 208A-214A. The daisy-chained synchronization bus may include one or more direct, point-to-point connections between circuits 208A-214A, such as bus 602A between circuit 208A and 210A, bus 604A between circuit 210A and 212A, and bus 606A between circuit 212A and 214A. The circuits 208A-214A may include a receiver to receive a signal from one of the daisy-chained busses, and a transmitter to transmit a signal on another of the daisy-chained busses.

In operation, circuit 208A may receive request signal on bus 608. In response, circuit 208A may send a signal to circuit 210A via daisy-chain bus 602A indicating that a request for data was received. Circuits 210A, 212A, 214A may relay the request along daisy-chain busses 604A and 606A until all the circuits have received and are aware of the request signal received on bus 608.

Subsequently, each circuit 208A-214A will transmit a signal and data onto the daisy-chained bus to synchronize transmission with the next circuit. For example, circuit 214A may transmit its data to circuit 212A via bus 606A. Circuit 212A may append its data to the data it received from circuit 214A, and transmit the resulting data to circuit 210A via bus 604A. Circuit 214A may append its data to the data it received from circuit 212A, and transmit the resulting data to circuit 208A via bus 602A. Circuit 208A may append its data to the data received from circuit 210A. Because circuit 208A is the last circuit in the daisy chain, circuit 208A may calculate and append any error codes to the data, and transmit the resulting packet out onto output line 608. A computing device coupled to output line 608 may receive the packet for subsequent processing.

Although not shown, electronic device 204" may have an additional daisy-chained bus between circuit 214" and circuit 208" to make a complete daisy-chain circle between the circuits 208"-214". This allows any arbitrary circuit in the daisy-chain to be configured as the first circuit to transmit.

Figure 6B:
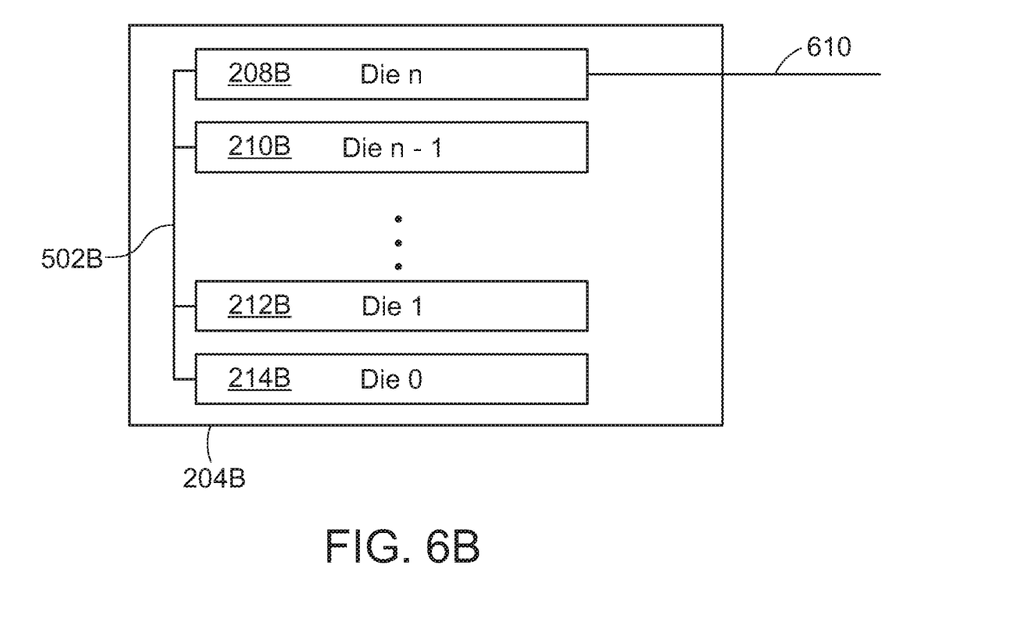
FIG. 6B is a block diagram of another embodiment of a device that communicates serial data over a bus.

Referring to FIG. 6B, in another embodiment, an electronic device 204B may be similar to the electronic devices 204, 204', 204", and/or 204A described above, and communication circuits 208B-214B may be similar to the communication circuits described above.

Electronic device 204B may include an internal synchronization bus 502B to synchronize transmission of data units by the communication circuits 208B-214B. In this example, bus 502B may be a shared, or common, bus that can be written to and read from by each circuit 208B-214B. Thus, circuits 208B-214B may drive signals onto and read signals from synchronization bus 502B during communication. The circuits that are not currently driving a signal onto bus 502B may read the signals transmitted by the other circuits. In embodiments, synchronization bus 502B may be a serial bus or a parallel bus.

In one example, circuit 208B may receive a request for data signal on bus 610. Subsequently, circuit 208B may transmit a signal onto synchronization bus 502B, informing circuits 210B-214B of the request for data received on bus 610.

Subsequently, each circuit 208B-214B may drive data on synchronization bus 502B. Each circuit may also drive a signal onto synchronization bus 502B to indicate an end of transmission onto bus 502B by the respective circuit. For example, circuit 214B may drive data unit 308 onto bus 502B. Circuit 210B may drive data unit 310 onto bus 502B, etc. Each circuit may also drive a signal onto bus 502B at the beginning or end of driving a data unit in order to negotiate data transmission on the shared bus 502B.

One or more of the circuits may aggregate the data into message 306. For example, circuit 208B may aggregate the data units received from the other circuits and append its own data unit to message 306. Then, circuit 208B may transmit the message 306 (and any required communication protocol elements such as pause pulse 302 and/or request 304) onto bus 610.

In other embodiments, each communication circuit may aggregate its own data unit to the message, then transmit the message into shared bus 502B. For example, circuit 214B may transmit data unit 308 onto bus 502B. Circuit 212B may receive data unit 308 and append data unit 310 to it. Circuit 212B may then transmit both data unit 308 and 310 onto bus 502B. This process may continue, each circuit adding its own data unit to the growing packet, until packet 306 is fully formed. At that point, circuit 208B may transmit the fully formed packet 306 onto bus 610.

Each circuit may also transmit its sequence number onto synchronization bus 502B. For example, at the end of its transmission, circuit 208B may transmit its sequence number '0' onto bus 502B. The other circuits may receive this transmission as acknowledgment that circuit 208B completed its transmission. In response, the next circuit in the sequence may transmit its data onto bus 502B and transmit its sequence number '1' onto synchronization bus 502B to indicate that it completed its transmission. This process may continue until all the communication circuits have transmitted their data units onto bus 502B.

The other circuits (i.e. the circuits that are not driving a data packet onto bus 502B) may read the signal on bus 502B to determine when they should transmit their data packets. In one embodiment, circuits 208B-214B may count the number of logic signals to determine when they should transmit. For example, if circuit 214B is to transmit fourth in the sequence, circuit 214B may count the number of signals driven onto bus 502B by circuits 208B, 210B, and 212B. After circuit 214B counts three signals driven to bus 502B indicating that three data units have been transmitted to bus 502B, circuit 214B may transmit its data unit in the fourth position in the sequence. If circuit 214B is the last circuit in the sequence, it may not need to transmit its own signal onto bus 502B. However, in other embodiments, circuit 214B may transmit its own signal onto bus 502B, even if it is the last circuit in the sequence, to inform the other circuits that the last data unit was transmitted. The other circuits may then perform post transmission processing, if needed.

Figure 7:
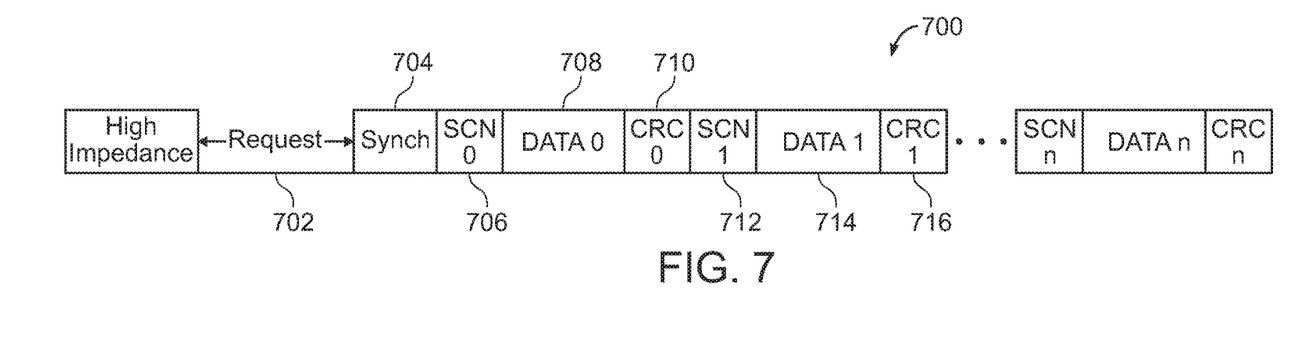
FIG. 7 is a data sequence diagram of a data messages for communication over a serial bus.
Figures 8, 9:
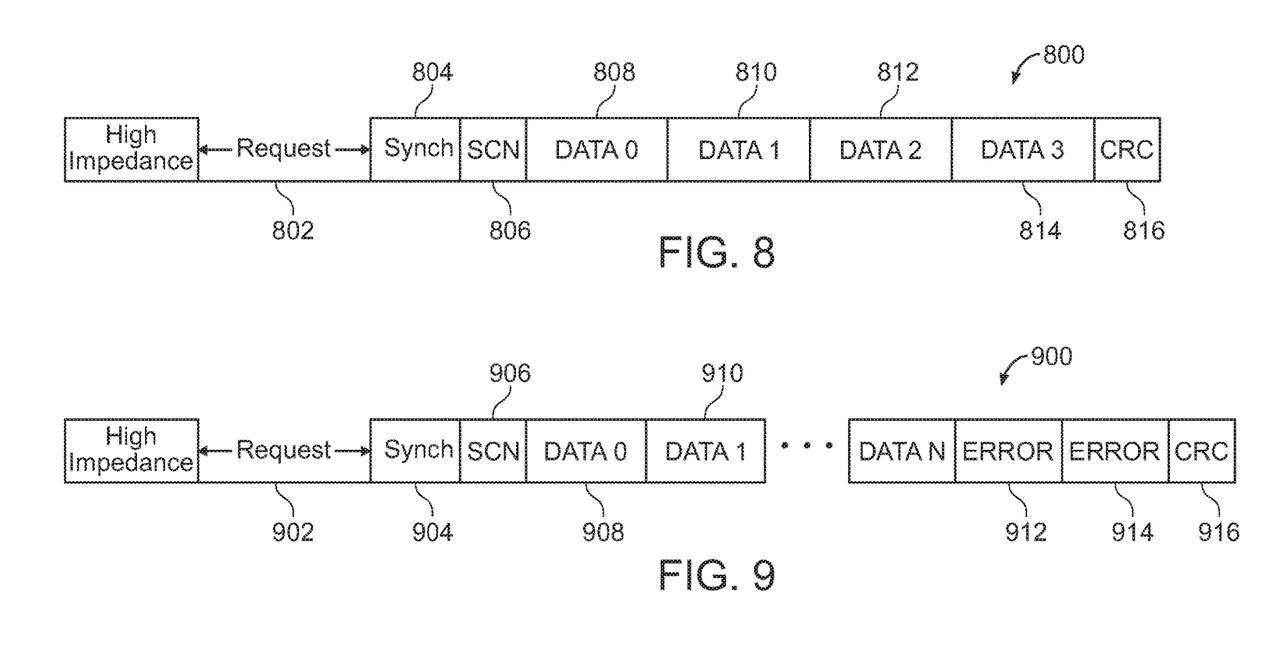
FIG. 8 is a data sequence diagram of a data messages for communication over a serial bus.
FIG. 9 is a data sequence diagram of a data messages for communication over a serial bus.

FIG. 7-FIG. 9 illustrate additional examples of data streams message sequences) sent by the communication circuits.

Data stream 700 begins with a request 702 from a host computer (e.g. computer 202 in FIG. 2). The host computer or one of the communication circuits 208-214 may then transmit a synchronization bit pattern 704 so that all the devices communicating on the bus can synchronize their respective clocks for transmitting and receiving serial data. A serial communication nibble (SCN) 706 containing information about the communication network and/or the data stream may be transmitted next by the host computer or one of the communication circuits. After SCN 706, circuit 208 may transmit its data unit 708. In embodiments, circuit 208 may also transmit an error pattern 710, which may be a CRC check, a parity bit, or any other type of error checking or correcting code.

When communication circuit 208 completes its transmission, circuit 210 may initiate its transmission by transmitting its own SCN 712, its data unit 711, and another error pattern 716. The other communication circuits may follow suit, transmitting their data in a predetermined order, until data stream 700 is complete. In this way, data stream 700 may include an SCN that precedes each data unit and an error sequence that follows each data unit. Synchronization between the communication circuits 208-214 may occur in any of the ways described above including, but not limited to, each circuit reading the transmissions, a common synchronization bus, a daisy-chained synchronization bus, etc.

Data stream 800 in FIG. 8 may include a single SCN and a single CRC. Data stream 800 begins with a request 802 from a host computer (e.g. computer 202 in FIG. 2). The host computer or one of the communication circuits 208-214 may then transmit a synchronization bit pattern 804 so that all the devices communicating on the bus can synchronize their respective clocks for transmitting and receiving serial data. A serial communication nibble (SCN) 806 containing information about the communication network and/or the data stream may be transmitted next by the host computer or one of the communication circuits. After SCN 806, circuit 208 may transmit its data unit 808, followed by data unit 810 transmitted by circuit 210, data unit 812 transmitted by circuit 212, and data unit 814 transmitted by circuit 214. During transmission, one of the communication circuits 208-214 may calculate an error code 816, such as CRC value and transmit the error code after the data units have been transmitted. Error code 816 may be calculated based on any or all of the preceding data units 808-812.

Data stream 900 in FIG. 9 may include a single SCN and a single CRC, as well as one or more error data units. Data stream 900 begins with a request 902 from a host computer (e.g. computer 202 in FIG. 2). The host computer or one of the communication circuits 208-214 may then transmit a synchronization bit pattern 904 so that all the devices communicating on the bus can synchronize their respective clocks for transmitting and receiving serial data. A serial communication nibble (SCN) 906 containing information about the communication network and/or the data stream may be transmitted next by the host computer or one of the communication circuits. After SCN 906, circuit 208 may transmit its data unit 908, followed by data unit 910 transmitted by circuit 210, and data units from the other communication circuits. After the data units have been transmitted, one or more of the communication circuits may transmit error data units 912 and 914. These data units may contain error codes that are useful to the host computer. For example, if circuits 208-214 are magnetic field sensors, the error data units 912, 914 may contain error codes relating to operation of the magnetic field sensors or detection of the magnetic field. During transmission, one of the communication circuits 208-214 may calculate an error code 916, such as CRC value and transmit the error code after the data units and error data units 912, 914 have been transmitted. Error code 916 may be calculated based on any or all of the preceding data units and error data units transmitted on the bus.

In embodiments, the final communication circuit to process the data unit may generate the error code. For example, if communication circuit 208" (see FIG. 6) is the last communication circuit in the daisy-chain to process the data unit, then communication circuit 208" may calculate error code 912, 914 and/or CRC 916.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited in this document are incorporated by reference in their entirety.

The invention claimed is:

1. A system comprising:
    a communication bus;
    a plurality of communication circuits each having an output driver coupled to the communication bus and each having an input terminal; and
    a synchronization bus, wherein the input terminals are connected to the synchronization bus to receive synchronization signals provided by the communication circuits,
    wherein each communication circuit produces, in response to a request message from a host controller device, a data communication on the communication bus in a predetermined order with respect to data communications from other communication circuits so that the data communication from each communication circuit form a sequential data stream in response to the request message,
    wherein the predetermined order is determined by the synchronization signals provided by the communication circuits, wherein each synchronization signal is transmitted on the synchronization bus by a respective communication circuit in response to the respective communication circuit producing the data communication, wherein the plurality of communication circuits includes a first communication circuit producing a first data communication and a synchronization message, wherein the data stream comprises:
  the first data communication; and
  the synchronization message before the first data communication.

2. The system of claim 1 wherein the input terminals are coupled to the communication bus to allow the communication circuit to read messages from the communication bus.

3. The system of claim 2 wherein the input terminal and the output driver of each communication circuit share a common connection to the communication bus.

4. The system of claim 1 wherein two or more of the communication circuits are situated in a same package.

5. The system of claim 4 wherein all the communication circuits are situated in the same package.

6. The system of claim 1 wherein the synchronization bus is internal to a package containing one or more of the communication circuits.

7. The system of claim 1 wherein at least a portion of the synchronization bus is external to a package containing one or more communication circuits.

8. The system of claim 1 wherein the synchronization bus is a common bus.

9. The system of claim 1 wherein the synchronization bus is a daisy-chain bus.

10. The system of claim 1 wherein the communication circuits transmit the data communications in response to synchronization signals received from the synchronization bus.

11. The system of claim 1 wherein one or more of the communication circuits produces an error check message,
  wherein the data stream includes the error check message.

12. The system of claim 11 wherein the error check message is generated based on all the data communications in the data stream.

13. The system of claim 12 wherein the error check message follows one or more of the data communications in the data stream.

14. The system of claim 13 wherein the error check message is generated at the end of the data stream.

15. The system of claim 1 wherein the communication circuits communicate on the bus according to a SENT protocol.

16. The system of claim 1 wherein each communication circuit comprises a magnetic field sensor.

17. The system of claim 1 wherein the data communications from each communication circuit form a time-contiguous data stream.

18. A system comprising:
  a communication bus;
  a plurality of communication circuits each having an output driver coupled to the communication bus and each having an input terminal; and
  a synchronization bus, wherein the input terminals are connected to the synchronization bus to receive synchronization signals,
  wherein each communication circuit produces, in response to a request message from a host controller device, a data communication on the communication bus in a predetermined order with respect to data communications from other communication circuits so that the data communication from each communication circuit form a sequential data stream in response to the request,
  wherein the plurality of communication circuits includes a first communication circuit producing a first data communication and a synchronization message,
  wherein the communications circuits are synchronized in the predetermined order using the synchronization signals in response to the synchronization message, and
  wherein the data stream comprises:
    the first data communication; and
    the synchronization message before the first data communication,
  wherein each synchronization signal is transmitted on the synchronization bus by a respective communication circuit in response to the respective communication circuit producing the data communication.

19. The system of claim 18 wherein one synchronization message is produced at the beginning of the data stream.

20. The system of claim 18 wherein the data stream comprises multiple synchronization messages, each preceding a data communication in the data stream.

21. A communication circuit comprising:
  an output driver coupled to a communication bus;
  an input terminal configured to receive a first synchronization signal from another communication circuit, the input terminal being coupled to a synchronization bus configured to receive synchronization signals; and
  a first communication circuitry configured to:
    produce, in response to the first synchronization signal, a first data communication on the communication bus in a predetermined order with respect to data communication from other communication circuits so that the first data communication is generated as a portion of a sequential data stream;
    synchronize the first data communication with respect to the data communication from the other communication circuits in response to the first synchronization signal received at the input terminal; and
    transmit a second synchronization signal in response to the first communication circuitry producing the first data communication;
  wherein the first synchronization signal is transmitted by a second communication circuit in response to the second communication circuit producing a second data communication as a portion of the sequential data stream,
  wherein the second data communication produced by the second communication circuit is produced in response to a request message from a host controller device,
  wherein the data stream comprises:
    the second data communication; and
    a synchronization message before the second data communication.

22. The communication circuit of claim 21 wherein the output driver and the input terminal are coupled to the same communication bus.

23. A method of communicating data from multiple communication circuits operating on a communication bus, the method comprising:
  receiving, on a communication bus from a host controller device, a request message by a plurality of communication circuits operating on the communication bus, the plurality of communication circuits comprising a first communication circuit;

receiving, on a synchronization bus by the plurality of communication circuits, synchronization signals to synchronize responses of the plurality of communication circuits; and in response to receiving the request message, transmitting, by each of the communication circuits, a communication message in a predetermined order with respect to data communications from other communication circuits, wherein the communication messages communicated by the communication circuits form a sequential data stream on the communication bus;

producing, by the first communication circuit, a first communication message and a synchronization message, wherein the data stream comprises the first communication message and the synchronization message before the first data communication, wherein the transmitting, by each of the communication circuits, comprises:
 determining the predetermined order using the synchronization signals provided by the communication circuits; and
 transmitting a synchronization signal by a communication circuit in response to the communication circuit producing the communication message.

* * * * *

UNITED STATES PATENT AND TRADEMARK OFFICE
CERTIFICATE OF CORRECTION

PATENT NO. : 10,747,708 B2
APPLICATION NO. : 15/915185
DATED : August 18, 2020
INVENTOR(S) : Nevenka Kozomora et al.

Page 1 of 2

It is certified that error appears in the above-identified patent and that said Letters Patent is hereby corrected as shown below:

In the Specification

Column 1, Line 17, delete "include a one" and replace with --include one--.

Column 2, Line 17, delete "may produces" and replace with --may produce--.

Column 2, Line 57, delete "DRAWING" and replace with --DRAWINGS--.

Column 3, Line 12, delete "over bus" and replace with --over a bus--.

Column 3, Lines 37-38, delete "element (AMR)" and replace with --(AMR) element--.

Column 3, Line 54, delete "a substrate" and replace with --to a substrate--.

Column 3, Line 57, delete "magneto resistance" and replace with --magnetoresistance--.

Column 4, Line 18, delete "(e.g." and replace with --(e.g.,--.

Column 5, Line 25, delete "(e.g. circuit" and replace with --(e.g., circuits--.

Column 5, Line 60, delete "(e.g." and replace with --(e.g.,--.

Column 6, Line 4, delete "(e.g." and replace with --(e.g.,--.

Column 6, Line 36, delete "(e.g." and replace with --(e.g.,--.

Column 6, Line 55, delete "(i.e." and replace with --(i.e.,--.

Column 6, Line 67, delete "trans" and replace with --transmit--.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,747,708 B2

Column 7, Line 9, delete "2-9'" and replace with --209'--.

Column 7, Line 16, delete "circuit" and replace with --circuits--.

Column 9, Line 3, delete "(i.e." and replace with --(i.e.,--.

Column 9, Line 23, delete "streams message" and replace with --streams (e.g., message--.

Column 9, Line 26, delete "(e.g." and replace with --(e.g.,--.

Column 9, Line 36, delete "CRC" and replace with --Cyclic Redundancy Check (CRC)--.

Column 9, Line 41, delete "711" and replace with --714--.

Column 10, Line 26, delete "CRC value" and replace with --a CRC value,--.

Column 10, Line 42, delete "that that" and replace with --that the--.